US009403681B2

(12) United States Patent
Waller et al.

(10) Patent No.: US 9,403,681 B2
(45) Date of Patent: Aug. 2, 2016

(54) AMMONIA OXIDATION CATALYST FOR THE PRODUCTION OF NITRIC ACID BASED ON METAL DOPED YTTRIUM ORTHO COBALTATE

(71) Applicant: YARA INTERNATIONAL ASA, Oslo (NO)

(72) Inventors: David Waller, Porsgrunn (NO); Marianne Søbye Grønvold, Porsgrunn (NO); Nibal Sahli, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 14/762,507

(22) PCT Filed: Jan. 24, 2014

(86) PCT No.: PCT/EP2014/051427
§ 371 (c)(1),
(2) Date: Jul. 22, 2015

(87) PCT Pub. No.: WO2014/114764
PCT Pub. Date: Jul. 31, 2014

(65) Prior Publication Data
US 2015/0353356 A1 Dec. 10, 2015

(30) Foreign Application Priority Data

Jan. 28, 2013 (NO) .................................... 20130145

(51) Int. Cl.
B01J 23/00 (2006.01)
B01J 23/02 (2006.01)
B01J 23/10 (2006.01)
B01J 23/32 (2006.01)
B01J 23/40 (2006.01)
B01J 23/42 (2006.01)
B01J 23/56 (2006.01)
B01J 23/58 (2006.01)
B01J 23/70 (2006.01)
B01J 23/74 (2006.01)
B01J 21/04 (2006.01)
C01B 21/38 (2006.01)
B01J 23/83 (2006.01)
B01J 23/889 (2006.01)
C01B 21/26 (2006.01)

(52) U.S. Cl.
CPC .............. *C01B 21/38* (2013.01); *B01J 23/002* (2013.01); *B01J 23/83* (2013.01); *B01J 23/8892* (2013.01); *C01B 21/265* (2013.01); *B01J 2523/00* (2013.01)

(58) Field of Classification Search
CPC ....... B01D 53/945; C01B 21/26; B01J 21/04; B01J 21/06; B01J 21/066; B01J 23/02; B01J 23/10; B01J 23/78; B01J 23/83; B01J 23/84

USPC ......... 502/302–304, 314, 320, 324, 327, 328, 502/332, 336, 349, 439; 423/392
See application file for complete search history.

(56) References Cited

U.S. PATENT DOCUMENTS

| 5,849,659 | A | * | 12/1998 | Tanaka | ................ | B01D 53/945 502/302 |
| 5,939,354 | A | * | 8/1999 | Golden | ................ | B01D 53/945 502/302 |
| 5,977,017 | A | * | 11/1999 | Golden | ................ | B01D 53/945 502/302 |
| 6,146,549 | A | * | 11/2000 | Mackay | ............ | B01D 67/0041 252/373 |
| 6,352,955 | B1 | * | 3/2002 | Golden | ................ | B01D 53/945 423/263 |
| 6,355,093 | B1 | * | 3/2002 | Schwartz | ............. | B01D 53/228 210/500.25 |
| 6,372,686 | B1 | * | 4/2002 | Golden | ................ | B01D 53/945 502/302 |
| 6,395,675 | B1 | * | 5/2002 | Suga | .................... | B01D 53/945 502/302 |
| 6,531,425 | B2 | * | 3/2003 | Golden | ................ | B01D 53/945 502/302 |
| 6,787,118 | B2 | * | 9/2004 | Roark | ...................... | A62D 3/38 422/177 |
| 7,151,067 | B2 | * | 12/2006 | Sakon | ................. | B01D 71/024 252/373 |
| 7,514,055 | B2 | * | 4/2009 | Golden | ................ | B01D 53/944 423/213.2 |
| 7,641,875 | B1 | * | 1/2010 | Golden | ................ | B01D 53/945 423/213.5 |
| 2002/0114746 | A1 | * | 8/2002 | Roark | ...................... | A62D 3/38 422/177 |
| 2004/0204315 | A1 | * | 10/2004 | Krumpelt | ............... | B01J 23/002 502/303 |
| 2009/0200519 | A1 | * | 8/2009 | Sawaki | ............. | C01G 49/0018 252/509 |
| 2010/0158784 | A1 | | 6/2010 | Estenfelder et al. | | |
| 2010/0278709 | A1 | | 11/2010 | Waller | | |
| 2013/0164494 | A1 | | 6/2013 | Estenfelder et al. | | |

FOREIGN PATENT DOCUMENTS

| EP | 0 532 024 | 9/1992 |
| EP | 2 202 201 | 6/2010 |
| RU | 2 185 237 | 5/2001 |
| WO | 2006/010904 | 2/2006 |
| WO | 2009/054728 | 4/2009 |

OTHER PUBLICATIONS

International Search Report issued Apr. 9, 2014 in International Application No. PCT/EP2014/051427.

(Continued)

*Primary Examiner* — Cam N. Nguyen
(74) *Attorney, Agent, or Firm* — Wenderoth, Lind & Ponack, L.L.P.

(57) ABSTRACT

The present invention relates to a catalytically active component of a catalyst, which comprises single phase oxides, based on a metal doped yttrium ortho-cobaltate oxide systems, methods for the oxidation of ammonia 5 and hydrocarbon in the presence of said catalytically active component and the use thereof.

8 Claims, No Drawings

(56) References Cited

OTHER PUBLICATIONS

Written Opinion of the International Searching Authority issued Apr. 9, 2014 in International Application No. PCT/EP2014/051427.
International Preliminary Report on Patentability issued May 7, 2015 in International Application No. PCT/EP2014/051427.
Gina Pecchi et al: "Catalytic performance in methane combustion of rare-earth perovskites $RECo_{0.50}Mn_{.050}O_3$ (RE: La, Er, Y)", Catalysis Today, Elsevier, NL, vol. 72, No. 1, Feb. 14, 2011, pp. 111-117, XP028275045.
Crystallographic Study of $YCo_{1-2x}{}^{3+}Co_x{}^{2+}Pt_x{}^{4+}O_3$ and $DyCo_{1-2x}{}^{3+}Co_x{}^{2+}Pt_x{}^{4+}O_3$ X. Liu et al., Journal of Solid State Chemistry 71, pp. 371-379 (1987).

* cited by examiner

AMMONIA OXIDATION CATALYST FOR THE PRODUCTION OF NITRIC ACID BASED ON METAL DOPED YTTRIUM ORTHO COBALTATE

FIELD OF THE INVENTION

The present invention relates to a catalytically active component of a catalyst, which comprises single phase oxides, based on metal doped yttrium ortho-cobaltate, catalysts comprising the catalytically active component, methods for the oxidation of ammonia in the presence of said catalysts comprising said catalytically active component and the use thereof.

BACKGROUND OF THE INVENTION

Currently, nitric acid is produced industrially via the catalytic oxidation of ammonia, over a platinum or platinum alloy-based gauze catalyst. This process, known as the Ostwald process, has essentially remained unchanged, since its inception in the first decades of the twentieth century. Ostwalds's patent was dated 1902 and when combined with Haber's development of synthesising ammonia, in 1908, the basis for the commercial production of nitric acid, which is used today, was in place.

The combustion of ammonia is carried out over a platinum based metal or alloy catalyst in the form of a gauze or mesh or net. A number of gauzes are installed together, and they constitute the gauze pack. The upper-most gauzes have compositions optimised for the combustion of ammonia, and are referred to as the combustion gauzes. Gauzes with other compositions may be located below the combustion gauzes, and these may have other roles, as described below. The whole stack of gauzes is referred to as the gauze pack. The gauzes are produced either by weaving or knitting.

The operating temperatures of the plants are typically 830 to 930° C. and the range of pressures is from 100 kPa to 1500 kPa. Typically, the combustion gauzes are installed in the plant for between six months and two years, depending on the plant operating conditions. Plants operating at high pressures typically have shorter campaigns than low-pressure plants.

The duration of the campaign is governed by a loss in the selectivity of the catalyst, towards the desired nitric oxide product, through the increased formation of unwanted nitrogen and nitrous oxide by-products. The loss of selectivity is related to a number of phenomena. During combustion, platinum is lost through the formation of $PtO_2$ vapour. Some of the platinum may be recovered by the installation of palladium metal based gauzes, directly below the platinum based combustion gauzes. The $PtO_2$ vapour alloys with the palladium, therefore, platinum is retained in the catalytically active zone. However, due to the depletion of platinum in the upper combustion zone of the gauze pack, not all of the ammonia is immediately combusted. If the ammonia is combusted in the palladium gauze region, the selectivity towards nitric oxide is reduced, and secondly, if ammonia and nitric oxide coexist in the vapour phase for a period of time, nitric oxide is reduced by ammonia, through a homogeneous reaction. This leads to both nitric oxide and ammonia losses. A final mechanism for loss of selectivity is related to the fact that the platinum is lost from the combustion gauzes at a higher rate than the other alloying elements (typically rhodium). This leads to rhodium enrichment of the gauze surface which leads to selectivity loss.

Over the last sixty years, many attempts have been made to replace the expensive platinum-based combustion catalyst with a lower cost catalysts, based for example on metal oxides. To date, the only commercially available oxide based catalyst for ammonia combustion, was developed by Incitec Ltd (Australia). This is based on a cobalt oxide phase. However, in terms of its selectivity of combustion of ammonia to the desired nitric oxide product, its performance is inferior to that of platinum-based systems. The cobalt oxide based systems have shown selectivity levels of circa 90%, in commercial units, compared to the 94 to 98% achieved with platinum based catalysts.

The use of mixed oxides with the perovskite structure, such as rhombohedral lanthanum cobaltate, as catalysts for ammonia oxidation, has received much attention. However, when considering the conditions that the catalyst is subjected to in industrial ammonia oxidation, it can clearly be seen that they are not suitable for stability reasons. Ammonia oxidation on an industrial scale, takes place at temperatures from 830 to 930° C. and at pressures from 100 kPa to 1500 kPa. The concentration of ammonia is in the range of 8.5 to 12 mol %, depending on plant conditions, with the remainder of the gas consisting of air. Thus the gas feed for oxidation has a composition of approximately 10 mol % $NH_3$, 18.7 mol % $O_2$ and the balance being nitrogen. When the ammonia is oxidised to NOx ($NO+NO_2$), with an efficiency of 95%, the gas composition is approximated by 9.5% NOx, 6% $O_2$ and 15% water vapour. (The balance of gas composition is nitrogen and some 800 to 2000 ppm of $N_2O$). Thus the ammonia oxidation catalyst is subjected to high temperatures and a gas environment that contains oxygen and water vapour. These are the ideal conditions for the evaporation of metal ions, in the form of hydroxides and oxyhydroxides. Thus material will be lost from the catalytic reaction zone as vapour phase species, which will in turn be deposited downstream in a cooler zone of the reactor system.

If considering evaporation from mixed oxides (those that contain more than one metal component), it most often has an incongruent evaporation process. This is the situation where one component in the oxide has a higher evaporation rate than another or than the others. If considering the lanthanum cobaltate perovskite system, when heated in an atmosphere containing oxygen and water vapour, cobalt species, such as CoOOH, have much higher vapour pressures than the dominant lanthanum species $La(OH)_3$. The effect of this is that cobalt evaporates to a larger extent than lanthanum, thus incongruent evaporation. The result of preferential cobalt evaporation is that in time, the non-stoichiometry limit of the lanthanum cobalt perovskite X will be exceeded ($LaCo_{1-x}O_3$ where X and $0<X \approx <0.03$). When the limit is exceeded, $La_2O_3$ will be precipitated. When operating, $La_2O_3$ does not have a negative effect on the catalyst performance. However, when the plant is shut-down or when it trips, the oxide catalyst is exposed to the ambient air. On cooling in air, the free $La_2O_3$ will hydrate; forming $La(OH)_3$. 1 mole of $La_2O_3$ will form 2 moles of $La(OH)_3$, which involves a 50% expansion of the volume of the free lanthanum species. This results in a mechanical disintegration of the catalyst.

Different perovskite type oxidation catalysts are known for use in different oxidation reactions. Examples of such catalysts and reactions are mentioned below.

Pecchi, G et al., "Catalytic performance in methane combustion of rare-earth perovskites $RECo_{o,50}Mn_{0,50}O_3$ (RE: La, Er, Y)", Catalysis today 172 (2011) page 111-117. This article describes physic-chemical properties for compounds where Co and Mn are present in equimolar quantities. The catalytic activity is related to methane combustion.

Russian patent RU2185237 describes catalysts for use in ammonia oxidation. The active catalyst is a composition with perovskite structure of the formula $Mn_{1-x}R_{1+x}O_3$, wherein R=Y, La, Ce or Sm and X=0–0.596. A catalyst support of alumina is used. However, this patent describes a method of producing $N_2O$, which is used in various areas as in semiconductors, perfume industries, in medicine and food industry. The catalysts show increased activity and selectivity for $N_2O$ and low selectivity for NO, which is the opposite of what is wanted for nitric acid production.

EP 532 024 relates to a catalyst for catalytic reduction of nitrogen oxide. More particularly, it relates to a catalyst for reduction of nitrogen oxide using a hydrocarbon and/or an oxygen-containing organic compound as a reducing agent, which is suitable for reducing and removing harmful nitrogen oxide present in emissions from factories, automobiles, etc. It is used a perovskite type compound oxide on a solid carrier. This catalyst selectively catalyses a reaction of nitrogen oxide with the reducing agent so that nitrogen oxide in emissions can be reduced efficiently without requiring a large quantity of the reducing agent.

SUMMARY OF INVENTION

The object of the invention is to find an oxide system suitable to be used as oxidation catalyst. A further object is to find a catalyst especially for ammonia oxidation where problems with swelling of the catalyst is avoided. Still a further object is to find a catalyst with high selectivity towards NOx and giving low levels of the undesired $N_2O$.

These and other objects of the invention are obtained by the oxide systems as described in the enclosed patent claims.

The present invention thus provides a catalytically component of a catalyst, comprising a catalytically active single phase oxide based on metal doped yttrium ortho-cobaltate oxide systems, with the general formula $YCo_{1-x}M_xO_3$, where X has values between 1>X>0, and M is a metal including manganese, iron, chromium, vanadium and titanium, aluminium or a transition metal, or an alkaline earth metal. Preferably X is greater than 0.1. In an embodiment of the invention the oxide phases has the general formula $YCo_{1-x}Mn_xO_3$ where X has values between 1>X>0, preferably 0.5>X>0, and in particular embodiments of the invention catalytically active component has the formula $YCo_{0.9}Mn_{0.1}O_3$, $YCo_{0.8}Mn_{0.2}O_3$, $YCo_{0.7}Mn_{0.3}O_3$, $YCo_{0.5}Mn_{0.5}O_3$, $YCo_{0.9}Ti_{0.1}O_3$ or $YCo_{0.9}Fe_{0.1}O_3$.

Another embodiment of the invention concerns a catalyst for the oxidation of ammonia where the metal doped yttrium ortho-cobaltate is supported on a refractory support phase. The refractory support phase may be selected from the group consisting of cerium dioxide, zirconium dioxide, alumina, yttrium oxide, gadolinium oxide, and a mixed oxide of these refractory oxides, silicon carbide, and sodium zirconium phosphate type phases.

The invention also concerns a method for the oxidation of ammonia in the Ostwald process wherein a gas blend comprising ammonia and oxygen is converted in presence of a catalyst comprising a catalytically active single phase oxide based on metal doped yttrium ortho-cobaltate oxide systems, with the general formula $YCo_{1-x}M_xO_3$, where X has values between 1>X>0. Preferably the catalyst has a selectivity towards NOx (NO+$NO_2$), exceeding 90%, and a selectivity towards $N_2O$ (<0.05%).

Another embodiment of the invention concerns the use of a catalyst comprising stable, single phase oxides, based on a metal doped yttrium ortho-cobaltate oxide systems, with the general formula $YCo_{1-x}M_xO_3$, where X has values between 1>X>0, and M is a metal including manganese, iron, chromium, vanadium and titanium, aluminium or a transition metal, or an alkaline earth metal for the selective oxidation of ammonia. Preferably the oxide phase has the general formula $YCo_{1-x}Mn_xO_3$ where 1>X>0 or is selected from $YCo_{0.9}Mn_{0.1}O_3$, $YCo_{0.8}Mn_{0.5}O_3$, $YCo_{0.7}Mn_{0.3}O_3$, $YCo_{0.5}Mn_{0.5}O_3$, $YCo_{0.9}Ti_{0.1}O_3$ or $YCo_{0.9}Fe_{0.1}O_3$.

DETAILED DESCRIPTION OF THE INVENTION

The current invention is a catalyst especially for high temperature ammonia oxidation, which is resistant to the above hydration issues of lanthanum containing mixed oxides. An evaluation of the hydration resistance of large metal ions that may adopt a trivalent oxidation state shows that the following are candidates: Scandium, yttrium, gadolinium, terbium, dysprosium, holmium, erbium, ytterbium and lutetium.

Scandium is eliminated as it is too small to form an ortho cobaltate phase. Terbium, dysprosium, holmium, erbium, ytterbium and lutetium are suitable in terms of their ionic radii and hydration resistance, but they are very expensive. However, yttrium meets the set requirement in terms of ionic radii, when in the trivalent oxidation state and its hydration resistance.

Yttrium and cobalt, in a 1:1 mole ratio form a stable orthorhombic phase $YCoO_3$—yttrium ortho-cobaltate. When this mixed oxide phase is tested under industrially relevant ammonia oxidation conditions (a feed-stock containing 10% ammonia, 18% oxygen and a balance of inert gas or nitrogen, at a temperature of 900° C.), it combusts ammonia to a mixture of NOx (NO+$NO_2$), $N_2$ and $N_2O$. However, the selectivity towards the nitrogen containing oxides that are desired in the production of nitric acid (NOx) is lower than that obtained by platinum-based catalysts and is in the range of 91.3%. Examination of the $YCoO_3$ phase prior to and after the ammonia oxidation test, using X-ray powder diffraction, shows clearly that there has been a reduction of the $YCoO_3$ phase $$2YCoO_3 \rightarrow Y_2O_3 + 2CoO \qquad (1)$$

It is known that the CoO phase demonstrates some activity towards ammonia oxidation, but the selectivity towards desired NOx products is low—high levels of $N_2$ and $N_2O$ are produced.

Thermo-gravimetric analysis of the $YCoO_3$, in air shows that the $YCoO_3$ phase reduces according to equation 1, at a temperature of 970° C. When combusting ammonia at 900° C., as in industrial plants, the 900° C. temperature is that of the product gas directly downstream of the catalyst. The temperature of the catalyst is significantly higher than the gas temperature. Therefore, pure $YCoO_3$ is not sufficiently stable for use as an industrial ammonia oxidation catalyst.

From the literature, it is known that the yttrium ortho-ferrate phase $YFeO_3$ and the yttrium ortho-manganate phase $YMnO_3$, are stable in air, up to high temperatures (1500 and 1350° C., respectively). An approach to improve the stability of the yttrium ortho-cobaltate phase could be to replace a proportion of the cobalt with either iron or manganese (based on the fact that the pure iron and manganese yttrium phases are significantly higher in stability than the $YCoO_3$ phase. Two series of doped yttrium ortho-cobaltate phases were prepared, $YCo_{1-x}Mn_xO_3$ and $YCo_{1-x}Fe_xO_3$. Thermo-gravimetric analysis of these two series of yttrium ortho-cobaltates demonstrated that both iron and manganese doping of the yttrium ortho-cobaltates, improved the stability of the phases. A surprising, and unexpected result, is that the manganese doping is more effective at stabilizing the yttrium ortho-cobaltates, than iron doping, given that the stability of the pure $YFeO_3$ is much higher than the pure $YMnO_3$.

Samples of the $YCo_{1-x}Mn_xO_3$ catalysts were tested for their catalytic performance towards ammonia oxidation, in a laboratory test reactor system. They were found to be active towards ammonia oxidation with a high selectivity towards the desired $NO_X$ product.

TABLE 1

Performance of $YCo_{1-x}Mn_xO_3$ orthocobaltomanganates, sintered at 900° C., towards ammonia oxidation.

| Sample | Ignition temperature ° C. | Selectivity towards NOx % | $N_2O$ emission ppm |
|---|---|---|---|
| $YCoO_3$ | 271 | 91.3 | 50 |
| $YCo_{0.9}Mn_{0.1}O_3$ | 264 | 95.4 | 22 |
| $YCo_{0.8}Mn_{0.2}O_3$ | 248 | 95.5 | 22 |
| $YCo_{0.7}Mn_{0.3}O_3$ | 273 | 96.9 | 23 |
| $YCo_{0.5}Mn_{0.5}O_3$ | 257 | 94.3 | 37 |
| $YMnO_3$ | 239 | 92.4 | 112 |

In the table the corresponding values for $YCoO_3$ and $YMnO_3$ are also included for comparison. These compounds do not form a part of the invention.

It is observed that manganese doped yttrium ortho-cobaltate ($YCo_{1-x}Mn_xO_3$) exhibit both high selectivity towards the desired NOx product, along with low levels of the powerful $N_2O$ greenhouse gas. The compounds $YCo_{0.9}Mn_{0.1}O_3$, $YCo_{0.8}Mn_{0.2}O_3$, $YCo_{0.7}Mn_{0.3}O_3$ have especially low levels of $N_2O$ emission. X-ray powder diffraction analysis of the fresh and used manganese doped yttrium ortho-cobaltates show that these phases had not undergone a reduction towards:

$$2YTmO_3 \rightarrow Y_2O_3 + 2TmO \quad (2)$$

Where Tm is an oxide of cobalt and/or manganese. Thus the doping of yttrium ortho-cobaltate with a reduction resistant dopand, such as manganese leads to high selectivity towards NOx and low levels of the undesired $N_2O$, under industrially relevant oxidation conditions.

By adding a dopant like Mn, Fe, Ti or other transitions metals, the catalyst stability have increased. Samples of the $YCo_{1-x}M_xO_3$ catalysts where M is Fe or Ti, were tested for their catalytic performance towards ammonia oxidation, in the laboratory test reactor system. (See Table 2). Corresponding results for $YCoO_3$ is shown for comparison.

TABLE 2

Performance of $YCo_{1-x}Fe_xO_3$ and $YCo_{1-x}Ti_xO_3$ towards ammonia oxidation.

| Sample | Ignition temperature ° C. | Selectivity towards NOx % | $N_2O$ emission ppm |
|---|---|---|---|
| $YCoO_3$ | 271 | 91.3 | 50 |
| $YCo_{0.9}Fe_{0.1}O_3$ | 245 | 93.6 | 31 |
| $YCo_{0.9}Ti_{0.1}O_3$ | 284 | 95.3 | 25 |

The catalysts may be prepared by co-precipitation, complexation, combustion synthesis, freeze-drying or solid-state routes, or by other state-of-the-art methods of producing mixed-metal oxides. The catalysts according to the present invention can be used to catalyse several reactions.

Examples of such uses are:

I. The catalysts may be used as oxidation catalysts,
II. as catalysts for the selective oxidation of ammonia
III. as catalysts for the oxidation of hydrocarbons
IV. as catalysts for the complete oxidation of hydrocarbons to $CO_2$, in gas turbine power generation applications
V. as catalysts for the complete oxidation of hydrocarbons to $CO_2$, at temperatures below 600° C., for the abatement of hydrocarbon emissions from vehicle exhaust gases.

The invention claimed is:

1. A catalyst for the oxidation of ammonia, with a refractory support phase and a catalytically active single phase oxide, which comprises stable, single phase oxides, based on a metal doped yttrium ortho-cobaltate oxide system, having the formula $YCo_{1-x}M_xO_3$, wherein X has values between $1>X>0$, and M is iron, chromium, vanadium, titanium, aluminum or an alkaline earth metal, or the single phase oxide has the formula $YCo_{1-x}Mn_xO_3$ wherein $0.5>X>0$.

2. The catalyst according to claim 1, wherein M is iron or titanium.

3. The catalyst according to claim 1, wherein the single phase oxide has the formula $YCo_{0.9}Mn_{0.1}O_3$, $YCo_{0.8}Mn_{0.2}O_3$, or $YCo_{0.7}Mn_{0.3}O_3$.

4. The catalyst according to claim 1, wherein the single phase oxide has the formula $YCo_{0.9}Ti_{0.1}O_3$ or $YCo_{0.9}Fe_{0.1}O_3$.

5. The catalyst according to claim 1, wherein the refractory support phase is selected from the group consisting of cerium dioxide, zirconium dioxide, alumina, yttrium oxide, gadolinium oxide, silicon carbide, sodium zirconium phosphate type phases, and a mixed oxide of cerium dioxide, zirconium dioxide, alumina, yttrium oxide and gadolinium oxide.

6. A method for the oxidation of ammonia in an Ostwald process, wherein a gas blend comprising ammonia and oxygen is converted in the presence of a catalyst comprising stable, single phase oxides, based on a metal doped yttrium ortho-cobaltate oxide system, with the formula $YCo_{1-x}M_xO_3$, wherein X has values between $1>X>0$, and M is manganese, iron, chromium, vanadium, titanium, aluminum, a transition metal or an alkaline earth metal, for the selective oxidation of ammonia.

7. The method according to claim 6, wherein the catalyst has a selectivity towards NOx ($NO+NO_2$) exceeding 90%, and a selectivity towards $N_2O$ of less than 0.05%.

8. The method according to claim 6, wherein the single phase oxide has the formula $YCo_{0.9}Mn_{0.1}O_3$, $YCo_{0.8}Mn_{0.2}O_3$, $YCo_{0.7}Mn_{0.3}O_3$, $YCo_{0.5}Mn_{0.5}O_3$, $YCo_{0.9}Ti_{0.1}O_3$ or $YCo_{0.9}Fe_{0.1}O_3$.

* * * * *